Figure 7:
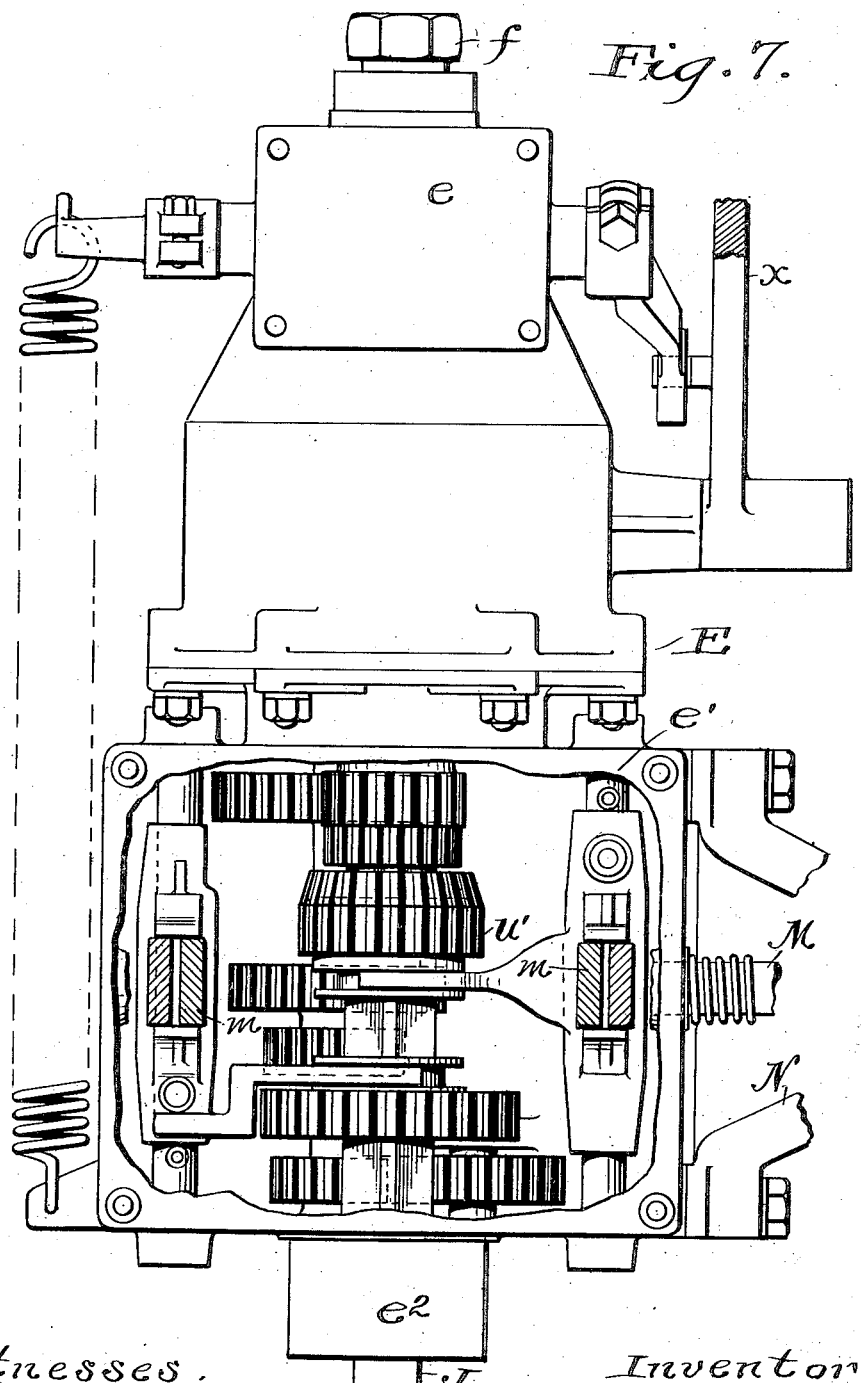

A. P. BRUSH.
AUTOMOBILE STRUCTURE.
APPLICATION FILED JAN. 12, 1910.
1,091,911.
Patented Mar. 31, 1914.
4 SHEETS—SHEET 1.
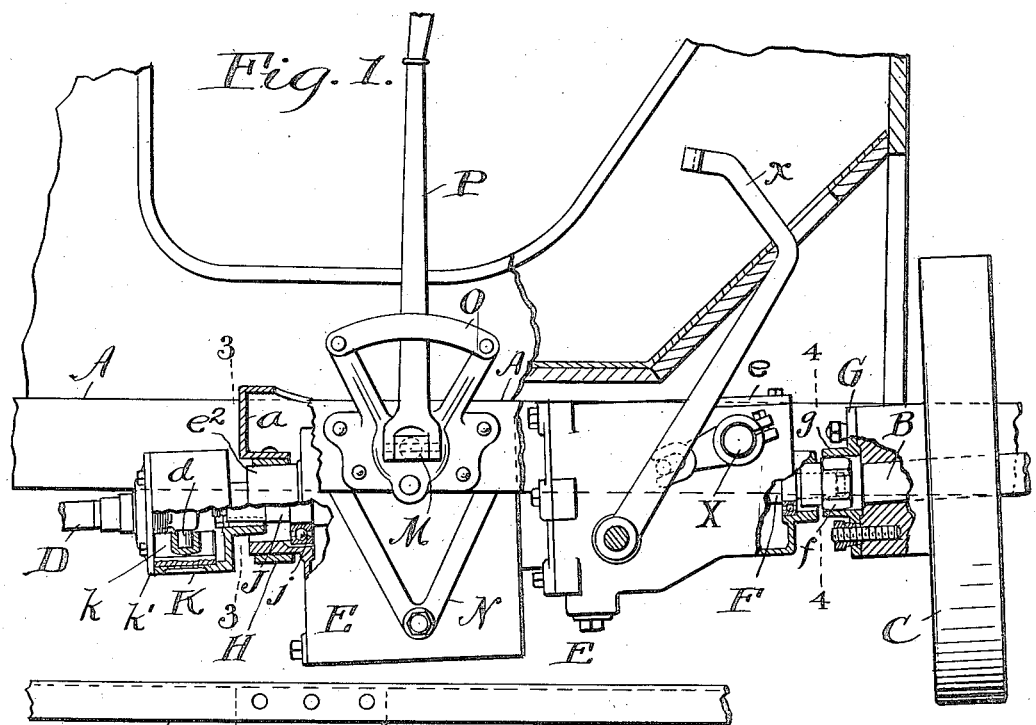
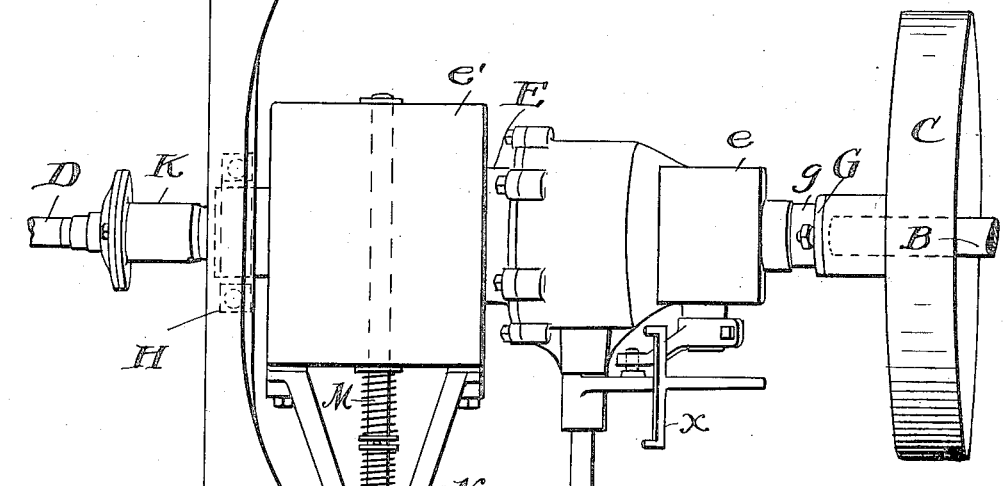
Witnesses:
E. B. Filchied
H. B. Sullivan.
Inventor:
Alanson P. Brush
by B. L. Thurston
Attorney

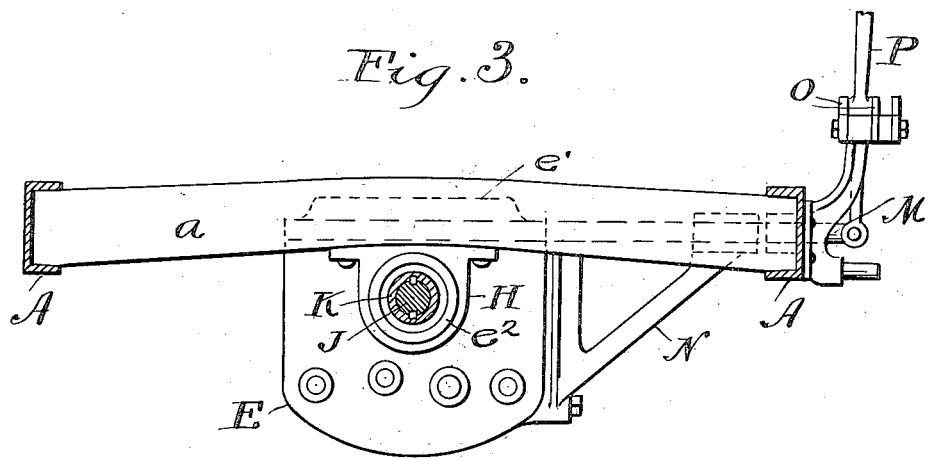
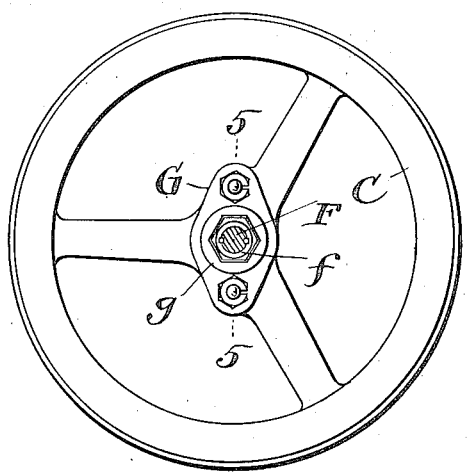
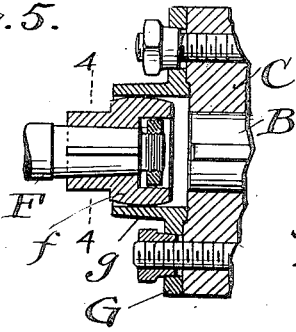

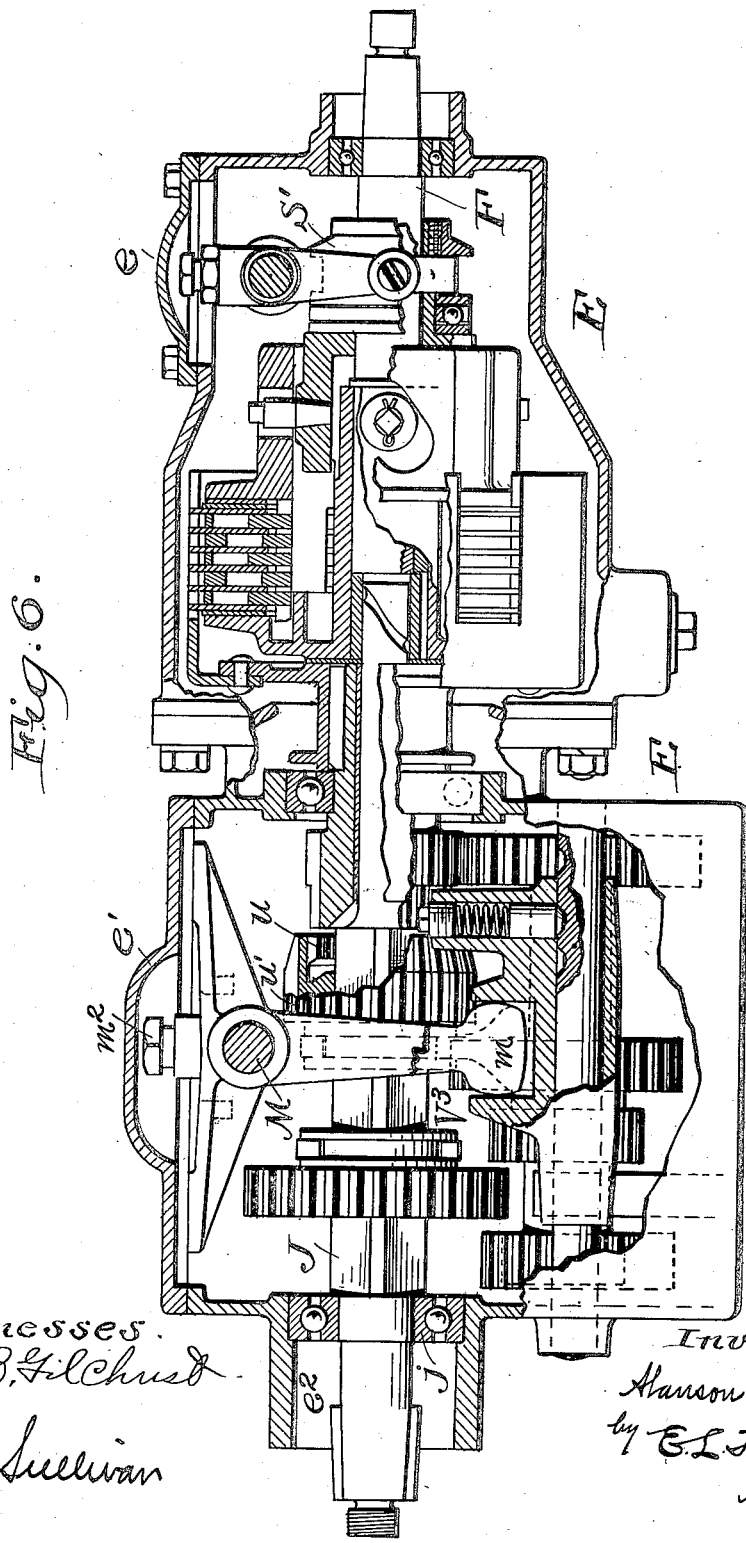

A. P. BRUSH.
AUTOMOBILE STRUCTURE.
APPLICATION FILED JAN. 12, 1910.

1,091,911.

Patented Mar. 31, 1914.
4 SHEETS—SHEET 4.

Witnesses.
E. B. Gilchrist
H. R. Sullivan

Inventor.
Alanson P. Brush.
by E. L. Thurston
Attorney

UNITED STATES PATENT OFFICE.

ALANSON P. BRUSH, OF FLINT, MICHIGAN.

AUTOMOBILE STRUCTURE.

1,091,911.   Specification of Letters Patent.   Patented Mar. 31, 1914.

Application filed January 12, 1910. Serial No. 537,626.

*To all whom it may concern:*

Be it known that I, ALANSON P. BRUSH, a citizen of the United States, residing at Flint, in the county of Genesee and State of Michigan, have invented a certain new and useful Improvement in Automobile Structures, of which the following is a full, clear, and exact description.

The object of this invention is to so support a transmission control unit (which includes the clutch mechanism, the change speed mechanism and a case inclosing these two mechanisms) in operative relation to the power shaft and propeller shaft of a motor car that said unit may be easily taken from and replaced in operative position whenever occasion requires.

The invention as embodied in the best specific form known to me is shown in the accompanying drawings, and is hereinafter described, and is carefully defined in the appended claims.

In the drawing, Figure 1 is a side elevation, partly broken away and sectioned of so much of a motor car as is necessary to disclose the present invention. Fig. 2 is a plan view of the mechanism shown in Fig. 1. Fig. 3 is a sectional view in the plane of line 3—3 on Fig. 1. Fig. 4 is a sectional view in the plane of line 4—4 on Fig. 1, and Fig. 5 is a sectional view in the plane of line 5—5 on Fig. 4. Fig. 6 is a central vertical sectional view through the transmission control unit. Fig. 7 is a plan view of the motor control unit with the cap plate at one end of the case broken away, and with the shifting arms and locking arms of the change speed mechanism sectioned and the shaft for operating said arms broken away.

In the drawing, A A represent the two side members of the chassis and $a$ one of the cross members thereof.

B represents the power shaft. It is preferably the crank shaft of the engine, but may be any shaft driven by the engine.

C represents the fly wheel which is keyed to the power shaft B, so that, to all intents and purposes, in so far as concerns this invention, it is a part of it.

D represents the so-called propeller shaft,—that is to say, the shaft which at its rear end drives the so-called differential mechanism of the rear axle, and at its front end has an operative connection with the terminal shaft of the change speed mechanism. In the construction shown the front end of this shaft is supported through its connection with the control mechanism; and it must be assumed that the rear end of the shaft is suitably mounted in the usual manner in order that it may do work for which it is provided.

The shaft B must be supported in bearings fixed to the chassis frame. If the shaft B be the crank shaft of the engine, said shaft will be mounted in the usual way in the engine crank case which is fixed to said frame.

E represents the control unit case which may be, as shown, a built-up structure having removable cap plates $e$, $e'$ located respectively over the clutch mechanism, and the change speed mechanism,—both of which mechanisms are mounted in said casing. In so far as the present invention is concerned, it is not material what form of clutch mechanism shall be employed, or what form of change speed gearing shall be employed. It is only essential that the initial member of the clutch mechanism shall be a rotatable shaft as F, suitably mounted in the casing and projecting from the front end thereof; and that the terminal shaft J of the change speed mechanism shall be axially alined with the initial member of the clutch mechanism and shall be mounted in suitable bearings in the case and shall project from the rear end thereof. This control unit must be supported between the power shaft and propeller shaft in such manner that motion may be transmitted effectively at all times from the power shaft to the propeller shaft through the mechanism of the control unit. In order that this may be done according to this invention, it is essential that the control unit shall have supports for its front and rear ends, which supports shall be coaxial with the initial member of the clutch mechanism and the terminal member of the speed changing mechanism, and that there shall be a third supporting point at one side of the axial line of the front and rear supports. In order to avoid the possibility of any strains due to road distortions or manufacturing variations, the front and rear supports are such as to permit the control unit to turn slightly about the axial line of said supports and to move slightly endwise, and to have a slight universal movement relative to said supports; and the third support must be such as permits a slight universal and telescoping movement therein of the part which projects into the supporting member from the control unit. Aiming at a simple but practical embodiment of this invention, the supports may be constructed as follows: The front end of the initial clutch member, *i. e.* shaft F, has keyed to it a collar $f$ which has some angular conformation in cross section, for example, hexagonal, and has slightly crowned sides. This collar telescopes loosely into a similar shaped socket $g$ in the hub of a cap G, which is bolted to the rear end of the fly wheel. This support is such that the front end of the control unit is supported through a simple form of universal joint by the power shaft; and it is evident that when said power shaft B is rotated the shaft F will likewise be rotated at the same speed.

The rear end of the case has a cylindrical tubular trunnion $e^2$ which is concentric with the terminal shaft J of the speed changing mechanism. This trunnion $e^2$ enters somewhat loosely a cylindrical hole in a bracket H which is fixed to the cross member $a$ of the chassis; and thereby the rear end of the control unit is supported. It is evident that when the shaft B is rotated the shaft F will likewise be rotated at like speed. It is also evident that the front end of the control unit is upheld by the described engagement of shaft F with shaft B.

The connection between the front end of the propeller shaft and the rear end of the terminal shaft J of the control unit should be through a suitable universal joint, a familiar form of which is shown in Fig. 1. This universal joint includes a housing K, the hub of which is keyed to the shaft J. This housing has diametrically opposed longitudinal grooves $k$ which receive roller carrying pins $d$ projecting from diametrically opposite sides of that part of the propeller shaft D which is extended into said housing.

The third connection between the control unit and the chassis is obtained through the shaft M which projects laterally from one side of the control case E and passes with some looseness through a bushed hole in one of the side members A of the chassis. A bracket N is preferably fixed to the side of the control case in order to provide a bearing for shaft M adjacent to the side member of the chassis. The primary function of this shaft M is to operate the change speed mechanism. This shaft is to be shifted endwise so as to selectively engage different mechanisms for shifting different gears, which are parts of the change speed mechanism; and it is to be rocked to move the selected shifting mechanism in the required direction. An operating lever P is pivoted to the end of this shaft on a substantially horizontal pivot and passes between two guide bars O, O placed some distance above the shaft M. By swinging the upper end of this lever outward or inward the lever will turn on one of these bars as a fulcrum and thereby the shaft M is moved endwise, and then by moving the lever forward or backward the shaft is turned as required.

In order to remove this control unit from operative position, one first withdraws shaft M so as to sever the connection between the side of the control unit and the chassis frame member. Then one disconnects the plate G from the rear end of the fly wheel hub. The control unit at its front end may now be lowered, and then said control unit may be pulled forward to withdraw the trunnion $e^2$ from the bracket H. To replace the control unit these operations are reversed.

It is obviously only necessary to loosen the screws $m^2$ in order to permit the endwise withdrawal of shaft M out of the case, so as to permit the removal of the control unit, as before described.

Any suitable clutch and change speed mechanism and selective operating mechanism may be employed, provided they are capable of being mounted in the case and of forming with it a control unit having the characteristics required to enable it to enter into and form a part of the combinations set forth in the claims.

Having described my invention, I claim:

1. In an automobile structure, the combination with the chassis frame, the power shaft, and the propeller shaft, of a transmission control unit comprising a case and clutch and change speed mechanisms therein, of supports for the front and rear ends of said unit, which supports are axially alined and permit said control unit to turn slightly about the axis of said supports and to move slightly endwise therein and to have a slight universal movement therein, and a third support consisting of a shaft projecting laterally from the control unit, and passing loosely through a hole in one of the side members of the chassis frame, and operative connections between the control unit and the power and propeller shafts.

2. In an automobile structure, the combination with the chassis frame, the power shaft, and propeller shaft, of a transmission control unit which includes a case and clutch and speed changing mechanisms mounted therein, the initial shaft of said clutch mechanism having a telescoping torque transmitting engagement with said power shaft, and the case having at its rear end a coaxial tubular trunnion, a bracket fixed to the automobile frame in which said trunnion is mounted, a universal joint connection between the terminal shaft of the change speed mechanism and the propeller shaft, and means engaging said case and automobile frame to prevent the turning of the transmission control unit on its main longitudinal axis.

3. In an automobile structure, the combination with the chassis frame, the power shaft, and propeller shaft, of a transmission control unit which includes a case and clutch and speed changing mechanisms mounted therein, the initial shaft of said clutch mechanism having a telescoping torque transmitting engagement with said power shaft, and the case having at its rear end a coaxial tubular trunnion, a bracket fixed to the automobile frame in which said trunnion is mounted, a universal joint connection between the terminal shaft of the change speed mechanism and the propeller shaft, a shaft mounted in said case and extending laterally therefrom and passing through one of the side members of the frame.

4. In an automobile structure, the combination with the chassis frame, the power shaft and propeller shaft, of a transmission control unit which includes a case and clutch and speed changing mechanisms therein, the projecting front end of the initial shaft of the clutch mechanism being angular in cross section, a plate which is removably connected to the rear end of the power shaft and contains a longitudinal angular recess which receives the angular front end of the initial shaft, means coaxial with the initial shaft for supporting the rear end of the transmission unit case, and a connection between the side of said transmission unit and the chassis frame.

In testimony whereof, I hereunto affix my signature in the presence of two witnesses.

ALANSON P. BRUSH.

Witnesses:
H. R. SULLIVAN,
E. L. THURSTON.